United States Patent [19]

Schnurer

[11] Patent Number: 5,291,740
[45] Date of Patent: Mar. 8, 1994

[54] DEFROSTING TOOL FOR CRYOSTAT COLD HEAD INTERFACE

[76] Inventor: Steven D. Schnurer, 312 S. Guildford Cir., Florence, S.C. 29505

[21] Appl. No.: 908,102

[22] Filed: Jul. 2, 1992

[51] Int. Cl.⁵ .................. F25D 21/06; F25D 3/00; F25B 45/00
[52] U.S. Cl. .................. 62/51.1; 62/77; 62/80; 62/151; 62/275; 62/293; 62/298
[58] Field of Search .................. 62/51.1, 77, 80, 150, 62/151, 152, 156, 275, 293, 298

[56] References Cited

U.S. PATENT DOCUMENTS

| | | | |
|---|---|---|---|
| 4,614,093 | 9/1986 | Bächler et al. | 62/100 X |
| 4,679,401 | 7/1987 | Lessard et al. | 62/100 X |
| 4,761,963 | 8/1988 | Kiese | 62/298 X |
| 4,906,266 | 3/1990 | Planchard et al. | 62/298 X |
| 4,995,237 | 2/1991 | Strasser | 62/275 X |
| 5,060,481 | 10/1991 | Bartlett et al. | 62/275 X |

FOREIGN PATENT DOCUMENTS 9002878  3/1990  World Int. Prop. O. .......... 62/55.5

Primary Examiner—John M. Sollecito
Assistant Examiner—Christopher B. Kilner

[57] ABSTRACT

Defrosting tool for maintaining the temporarily exposed cold head interface of a cryostat in frost-free condition. A plurality of electrically heated heat exchange surfaces of the tool simultaneously contacts a like plurality of cold head interface surfaces to vaporize frost formed on the latter. The tool further provides a passage for venting the vaporized frost to the surrounding environment.

8 Claims, 2 Drawing Sheets

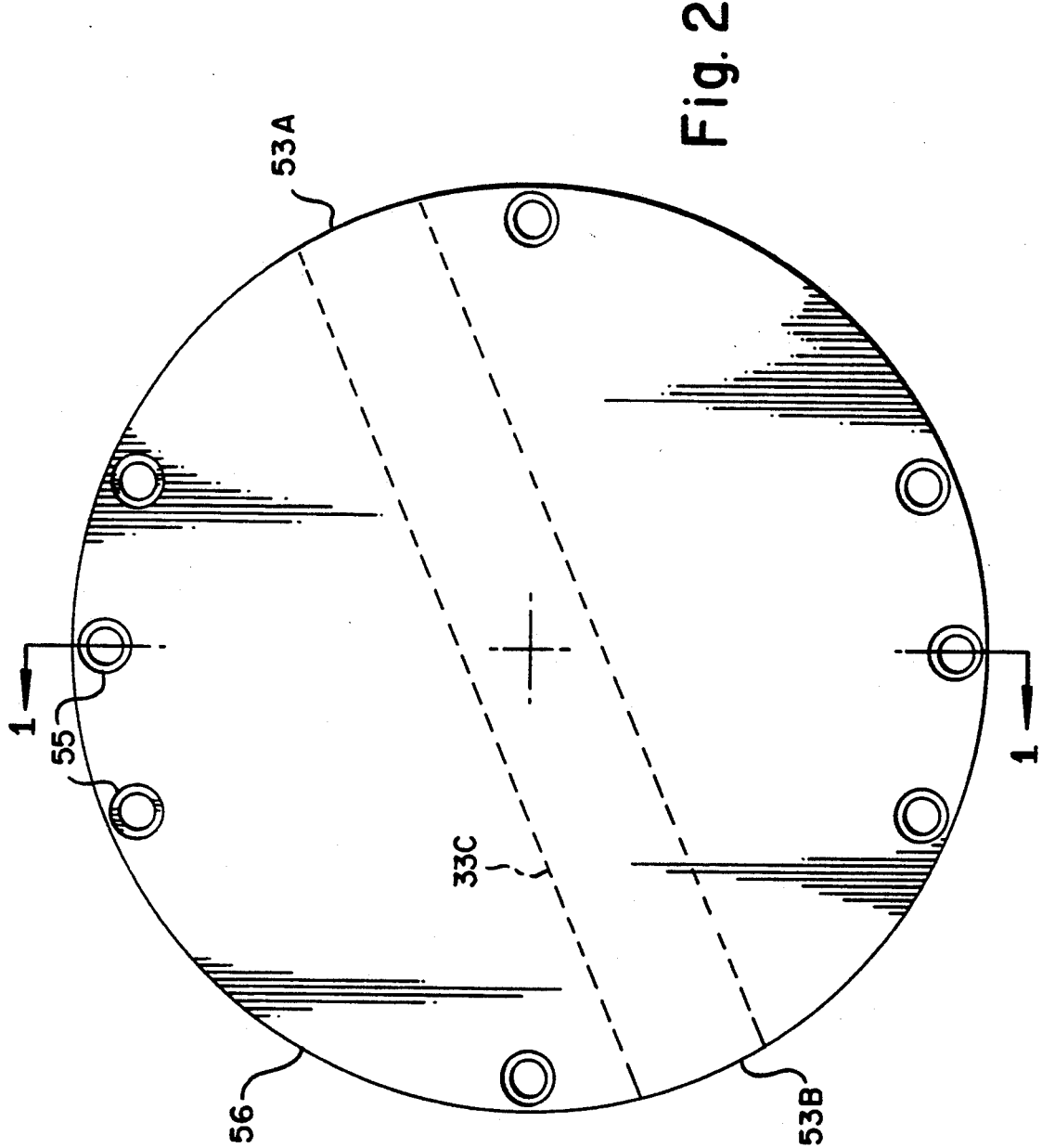

DEFROSTING TOOL FOR CRYOSTAT COLD HEAD INTERFACE

BACKGROUND OF THE INVENTION

The present invention relates in general to a defrosting tool and in particular to a tool for maintaining certain interior surfaces of a cryostat in frost-free condition. The interior surfaces referred to are the interface surfaces normally contacted by a removable cold head of the cryostat.

In order for the cold head to achieve the intended purpose of cooling the cryostat, it is important to maintain low thermal contact resistance at the interface surfaces. When the cold head is removed, e.g. for servicing and/or repair, moisture from air in contact with the cold, exposed interface surfaces precipitates on these surfaces and forms a layer of frost which increases the thermal contact resistance. The removal of this frost layer presents a problem because the interface surfaces are located deep inside the cryostat cavity and are therefore not easily accessible. Measures taken heretofore to cope with this problem have produced inadequate results. For example, hot air has been blown into the cavity in order to melt and evaporate the frost layer. Such a procedure can require as many as six hours before the frost covered surfaces are completely cleared. Other measures taken to date have been similarly unsuccessful.

Accordingly, it is a principal object of the present invention to provide apparatus for substantially reducing the amount of time required for removing the frost formed on the exposed interface surfaces of a cryostat.

It is another object of this invention to provide a new and improved tool for removing frost that forms on the exposed interface surfaces of a cryostat in minimum time and to maintain these surfaces in frost free condition pending the return of the cold head to the cryostat.

SUMMARY OF THE INVENTION

The present invention is directed to a tool for defrosting and maintaining the temporarily exposed cold head interface of a cryostat in frost-free condition. The cold head interface comprises a cavity normally occupied by a removable cold head and having a plurality of interface surfaces. The tool includes a like plurality of heat stations each having a heat exchange surface corresponding to one of the interface surfaces. The heat exchange surfaces are oriented to make simultaneous thermally conductive contact with the interface surfaces when the tool is in its operative position.

Each heat station carries a temperature controlled electrical heater which conductively heats the corresponding heat exchange surface such that frost on the contacted interface surface is cleared after a relatively short period of time. The tool further provides a passage for venting water vapor formed by the melted layer of frost to the surrounding environment.

These and other objects of the invention together with further features and advantages thereof will become apparent from the following detailed specification when read with the accompanying drawings in which applicable reference numerals have been carried forward.

BRIEF DESCRIPTION OF THE DRAWINGS

FIG. 2 is a top view of the cover plate shown in FIG. 1.

DETAILED DESCRIPTION OF THE INVENTION

Figure 1:
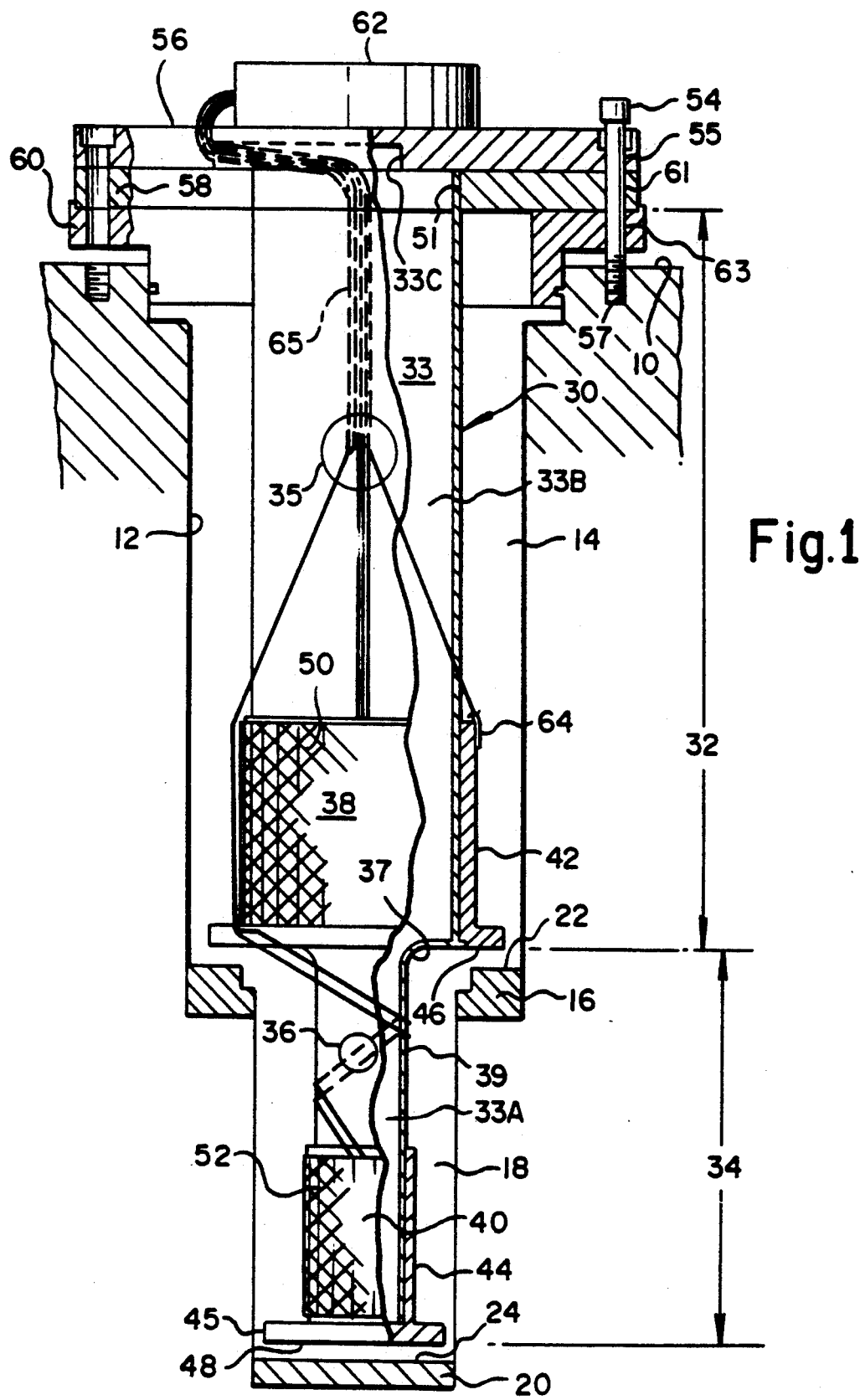
FIG. 1 is a partial cross sectional view of the defrosting tool in accordance with the present invention, the cross sectional portion of the cover plate shown therein being taken at line 1—1 of FIG. 2.

FIG. 1 shows a portion of a cryostat 10 having a cavity 12 normally occupied by a removable cold head (not shown). The cold head and associated structures may be similar to that disclosed in U.S. Pat. No. 4,930,318, assigned to the assignee of the present invention. Cavity 12 includes a first cylindrical chamber 14 open at opposite ends. As shown, at the lower cavity end the opening is constricted by an interior shoulder 16, preferably consisting of a copper material or the like. Shoulder 16 presents an annular interface surface 22 to chamber 14. A second cylindrical chamber 18 of smaller diameter than chamber 14, extends from shoulder 16 coaxially with chamber 14. Chamber 18 is closed at its far end by a disk 20, preferably consisting of copper material. Disk 20 presents a circular interface surface 24 to chamber 18.

For proper operation of the cryostat, interface surfaces 22 and 24 must maintain low thermal contact resistance with the oppositely facing surfaces of the cold head which is normally present in cavity 12. Typically, interface surfaces 22 and 24 will be at temperatures below 100K. Thus, when the cold head is temporarily removed from the cavity, moisture from the ambient air will precipitate on the cold interface surfaces and will form a layer of frost thereon which must be removed in order to reestablish low thermal contact resistance between the replacement cold head and surfaces 22 and 24.

FIG. 1 further shows a tool 30 that, for the sake of illustration, is pictured slightly before tool 30 is fully inserted in its operating position into cavity 12. Tool 30 includes first and second hollow cylindrical stages 32 and 34, coaxially aligned and shaped to permit entry thereof into chambers 14 and 18, respectively. These stages are preferably formed of stainless steel or of a similar material having relatively low thermal conductivity in order to minimize conductive heat transfer therethrough. For the same reason, the wall thickness of each stage is small, e.g. on the order of "0.035". The hollow interior 33A and 33B of stages 34 and 32, respectively constitute portions of a common passage 33 which communicates with chambers 14 and 18 through holes 35 and 36, respectively and subsequently with the external environment. An intermediate flange 58 includes a central opening 51 that establishes communication between passage portion 33B and a further passage portion 33C formed as a groove in a cover plate 56.

Stage 32 includes a heat station 38 which comprises a cylindrical drum 42 located at the lower end of the stage. Similarly, stage 34 includes a heat station 40 comprising cylindrical drum 44 at the lower stage end. Both drums are preferably constructed of copper or similar material having relatively high thermal conductivity and they have a wall thickness on the order of 0.200" for efficient thermal conduction therethrough. As seen from FIG. 1, the upper portion 39 of stage 34 has a smaller diameter than drum 42 to which it is affixed by way of a transition 37. As a consequence, an annular heat exchange surface 46 is defined at the lower end of drum 42, opposite to interface surface 22. Drum 44 terminates in a disc-shaped end 45 of a diameter larger than drum 44, which includes a circular heat exchange surface 48. Drums 42 and 44 have electric wire heaters 50 and 52, respectively affixed to the drum wall. Upon being energized, these heaters heat their respective drums and thereby heat exchange surfaces 46 and 48, respectively.

Each heat exchange surface 46 and 48, and each oppositely facing interface surface, is seen to be perpendicular to the common axis of the tool. The axial tool dimensions are chosen to provide thermal contact between each interface surface and its corresponding heat exchange surface when the tool is fully inserted. Such contact is maintained by means of threaded bolts 54 which are spaced around the periphery of cover plate 56 and which extend through holes 55 in the cover plate, through holes 61 in intermediate flange 58 and through holes 63 in an annular adapter flange 60 to engage a corresponding set of threaded holes 57 in cryostat 10.

A thermocouple 64 is affixed to drum 42 so as to sense the temperature of the latter. The thermocouple may be of the commercially available J type. The drum temperature is taken as an indication of the temperature of heat exchange surface 46 and 48. Thermocouple 64 is connected to a presettable temperature controller 62 which is mounted on cover plate 56. The temperature controller having an operating range between 0° and 300° F. controls the operation of heaters 50 and 52. Thus, the temperature of heat exchange surfaces 46 and 48 is maintained at the preselected temperature. It will be appreciated that the temperature controller may also be of the open-loop kind which requires no feedback signal from the thermocouple. In either case, the temperature of the heat exchange surfaces is kept sufficiently high to vaporize the frost layer on interface surfaces 22 and 24.

FIG. 2 is a top view of cover plate 56 which includes the aforesaid groove 33C. The groove radially traverses the cover plate and terminates in opposite groove ends 53A and 53B which are open to the external environment. Thus, passage 33 provides a complete path to the external environment for vapor formed in cavity 12 during operation of the tool. As seen in FIG. 1, passage 33 further holds a set of electrical leads 65 which connect temperature controller 62 to heaters 50, 52 and thermocouple 64.

In operation, when tool 30 is inserted into cavity 12 and bolts 54 are fully tightened to cryostat 10, an efficient thermal contact is simultaneously established between heat exchange surfaces 46, 48 and interface surfaces 22, 24 respectively. The heat applied by electrical heaters 50 and 52, heat up surfaces 46 and 48 respectively, such heat being conductively transferred to surfaces 22 and 24 respectively, to cause the layer of frost on these interface surfaces to vaporize. The vapor so formed enters holes 35 and 36 and is vented to the surrounding environment through passage 33. As a consequence, the frost-free interface surfaces can be promptly reengaged by a replacement cold head without degradation of performance.

The present invention has been described in the context of a defrosting tool for the cold head interface of a cryostat. It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be determined solely by the appended claims.

What is claimed is:

1. A tool for defrosting and maintaining the cold head interface of a cryostat in frost-free condition during temporary exposure of said interface to the external environment upon removal of said cryostat said tool comprising:
   at least one heat station including a first heat exchange surface oriented to make thermally conductive contact with an oppositely facing first surface of said cold head interface when said tool is in its operative position in said cryostat;
   means for electrically heating said heat exchange surface;
   temperature responsive means for controlling the operation of said heating means;
   whereby frost formed on said interface surface after removal of said cryostat is vaporized through contact with said heated heat exchange surface; and
   a passage to said external environment for the vaporized frost.

2. Apparatus in accordance with claim 1 wherein said tool further comprises at least a second heat station including a second heat exchange surface oriented to make thermally conductive contact with an oppositely facing second cold head interface surface when said tool is in said operative position;
   means for electrically heating said second heat exchange surface; and
   said temperature responsive means including means for sensing the temperature of at least one of said heating means.

3. Apparatus in accordance with claim 1, wherein passage vents said vaporized frost from said interface surface to the external environment.

4. Apparatus in accordance with claim 2, wherein each of said heat stations includes a thermally conductive drum having one end surface forming said heat exchange surface, normal to the drum axis;
   said heating means including electric heating wires disposed on the wall surface of said drum in contact therewith.

5. Apparatus in accordance with claim 4, wherein said sensing means includes a thermocouple disposed on the wall surface of at least one of said drums.

6. A tool for defrosting first and second interior interface surfaces of a cryostat cavity normally occupied by a removable cold head and for maintaining said interface surfaces in a frost-free condition, said cavity including at least a first chamber open at opposite ends, and a second chamber extending from an interior shoulder of said first chamber and being closed at its far end, said first and second interface surfaces being located at said shoulder of said first chamber and at said far end of said second chamber respectively;
   said tool comprising:
   first and second stages mutually aligned in fixed spatial relationship and shaped to permit entry thereof into said first and second chambers respectively, each of said stages terminating in a heat station, said heat stations including first and second heat exchange surfaces each capable of making thermally conductive contact with a corresponding, oppositely facing interface surface of said cavity when said tool is in its operative position therein after removal of said cold head; and means carried by said tool for heating said first and second heat exchange surfaces;

whereby frost formed on said first and second interface surfaces upon removal of said cold head is vaporized by contact with said heated heat exchange surfaces.

7. Apparatus in accordance with claim 6, wherein said tool includes a continuous passage for venting vaporized frost to the external environment.

8. Apparatus in accordance with claim 7, wherein said first and second heat stations comprise mutually spaced, coaxial drums;

the diameter of said first heat station being such as to bring an annular portion of said first heat exchange surface into contact with said first interface surface when said tool is in its operative position;

said second heat exchange surface being circular in shape;

said heat exchange surfaces being normal to said common axis and being mutually spaced along the latter to make simultaneous contact with said interface surfaces upon insertion of said tool.

* * * * *